United States Patent [19]
DeFusco et al.

[11] 3,948,336
[45] Apr. 6, 1976

[54] VEHICLE SUSPENSION SYSTEM

[75] Inventors: Ernest L. DeFusco, Clawson; John B. Swetka, Warren, both of Mich.

[73] Assignee: General Motors Corporation, Detroit, Mich.

[22] Filed: Dec. 12, 1974

[21] Appl. No.: 532,070

[52] U.S. Cl. ...... 180/43 R; 280/96.2 R; 280/96.2 B; 267/20 A
[51] Int. Cl.² .......................................... B60G 3/18
[58] Field of Search........ 180/43 R, 43 A, 44 R, 42; 280/96.2 R, 96.2 B, 124 A; 267/20 A

[56] References Cited
UNITED STATES PATENTS

| | | | |
|---|---|---|---|
| 2,069,420 | 2/1937 | Paton | 280/96.2 R |
| 2,115,915 | 5/1938 | McCain | 280/96.2 B |
| 2,153,271 | 4/1939 | Paton | 280/96.2 R |
| 2,202,665 | 5/1940 | Metz | 280/96.2 B |
| 2,596,922 | 5/1952 | Thoms | 280/96.2 R |
| 2,608,260 | 8/1952 | Johnson | 280/96.2 R X |
| 3,212,597 | 10/1965 | Behles et al | 280/96.2 R X |
| 3,497,233 | 2/1970 | Bolaski | 280/96.2 R |

*Primary Examiner*—Kenneth H. Betts
*Attorney, Agent, or Firm*—John P. Moran

[57] ABSTRACT

An independent wheel suspension system particularly suitable for recreational vehicles, providing high front end ground clearance therefor, the system including a pair of forwardly extending torque-reaction struts, each extending from a pivotal connection along the side of the automotive frame to a location adjacent the center of one of the front wheels for connection therewith of a steering knuckle and wheel support member, with upper and lower lateral control arms being pivotally mounted between respective upper and lower portions of the support member and portions of the vehicle frame.

3 Claims, 4 Drawing Figures

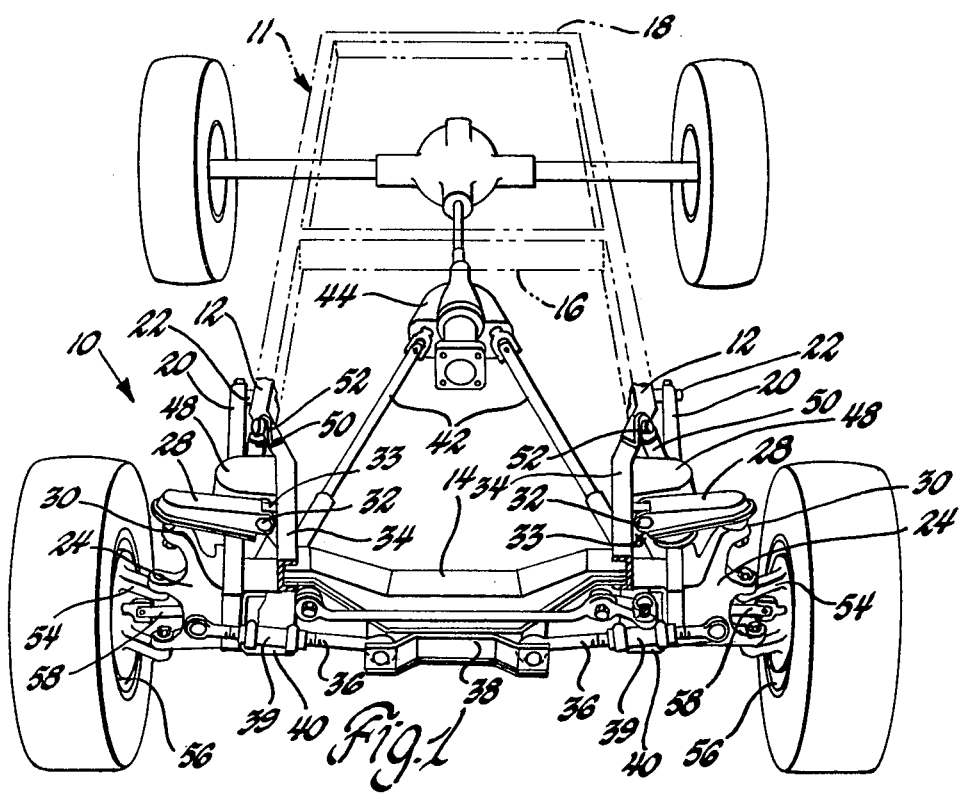
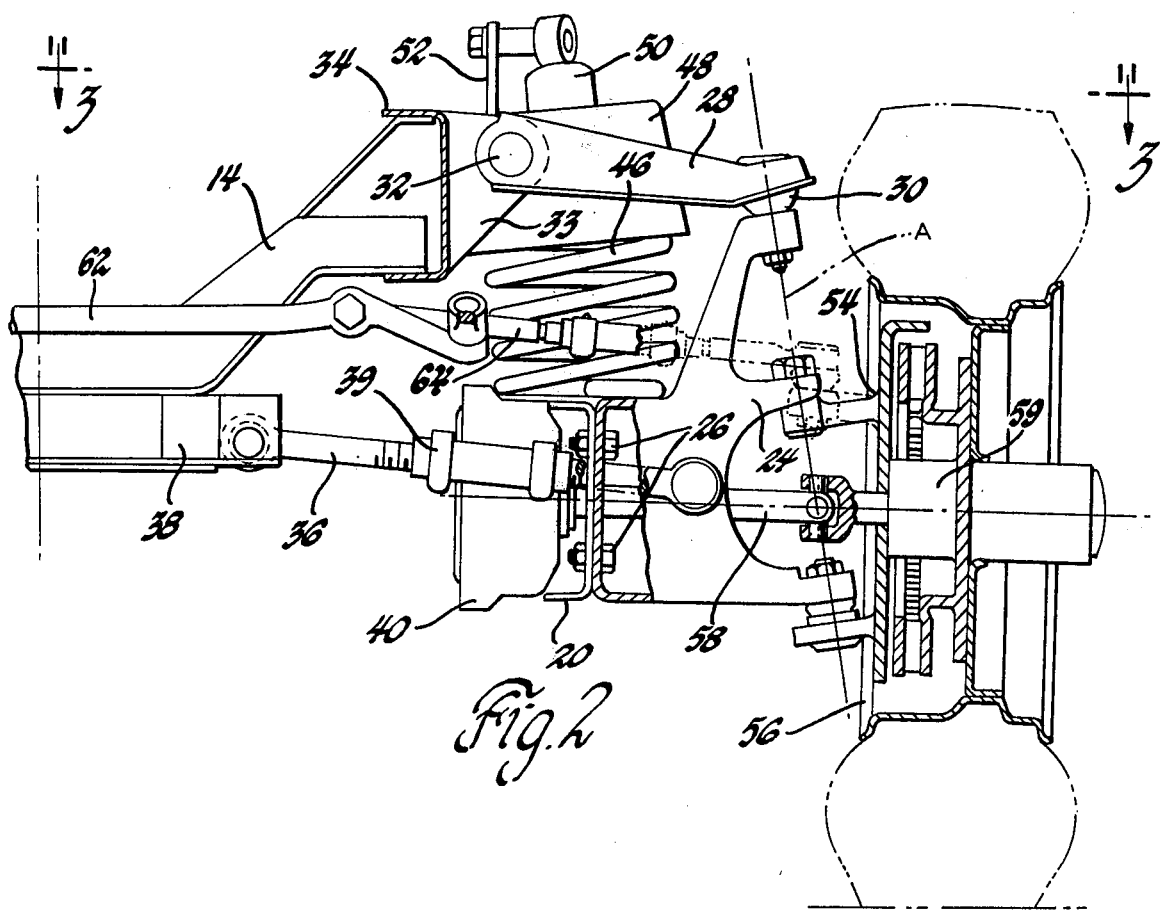

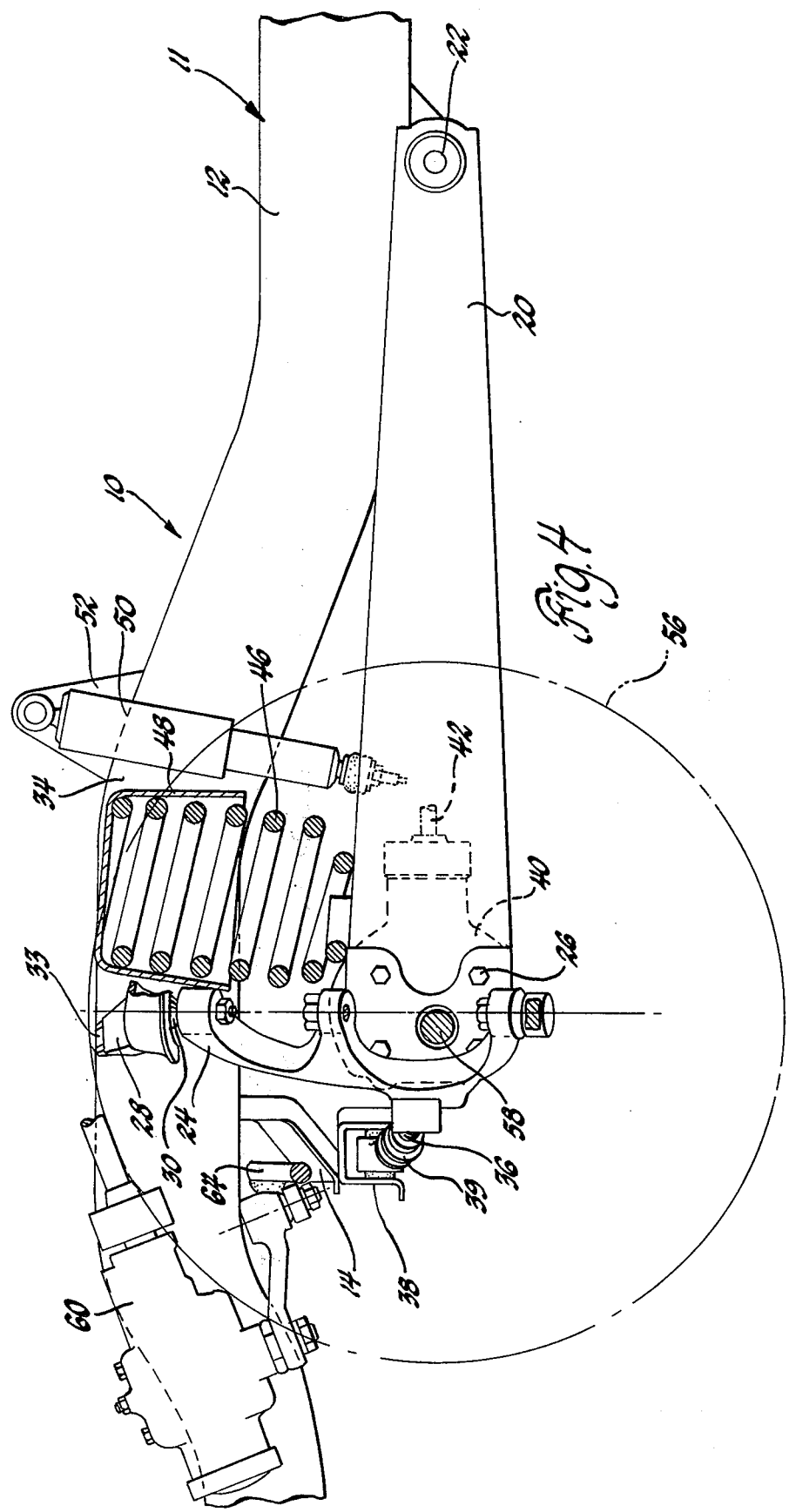

VEHICLE SUSPENSION SYSTEM

This invention relates generally to vehicle suspension systems and, more particularly, to an improved independent front suspension system particularly adapted for front wheel or four wheel drive applications.

In designing a vehicle suspension system, automotive engineers evaluate the expected usage of the proposed vehicle and then design a suspension system which is most suitable for that usage. For example, when evaluating the expected usage of an off-highway or recreational vehicle, engineers expect that such a vehicle will be driven over terrain requiring maximum tractive effort from all four wheels of the vehicle. Further, such terrain will probably include numerous hills and depressions which must be traversed. In addition, however, it is to be expected that the vehicle will also be operated on conventional paved roads. Each of these expectations dictates that the vehicle suspension system embody certain desirable characteristics. In particular, a rough terrain expectation dictates, first, that the suspension system provide maximum ground clearance at the front of the vehicle and, second, that it be readily adaptable to a front wheel driving arrangement. Further, a normal highway operation expectation dictates that the suspension system must provide ride and handling characteristics at least comparable to an ordinary passenger conveying automobile.

Accordingly, an object of the invention is to provide an improved suspension system which combines in a relatively simple and economical arrangement a plurality of elements which provide all the requirements for rough terrain conditions as well as conventional highway operations.

Another object of the invention is to provide an improved independent wheel suspension system for the front steerable road wheels of an automotive vehicle.

A further object of the invention is to provide an improved independent wheel suspension system particularly adapted for front wheel drive applications.

Still another object of the invention is to provide an improved suspension system which includes a torque-reaction strut pivotally supporting the steerable front road wheel and being supported on the sprung mass portion of the vehicle for projection in the direction of forward motion of the vehicle, providing for separated drive and suspension components, while maintaining a high front end ground clearance.

A still further object of the invention is to provide an improved suspension system including a pair of forwardly extending torque-reaction struts, each extending from a pivotal connection along respective sides of the frame to a location adjacent the centers of the front wheels for connection therewith of steering knuckles and wheel support members, with upper and lower lateral control arms being pivotally and resiliently mounted between respective upper and lower portions of the support member and portions of the vehicle frame, the lateral control arms being disposed, respectively, above and forward of the front wheel spindle axis so as to provide maximum space for the front wheel drive components.

Still another object of the invention is to provide an improved leading arm-type suspension system, wherein most desired wheel geometry can be readily controlled independent of the drive system, for example, roll center, anti-dive, and toe and camber characteristics.

These and other objects and advantages of the invention will be apparent when reference is made to the following description and accompanying drawings, wherein:

FIG. 1 is a perspective view of an automotive frame embodying the inventive suspension system;

FIG. 2 is an enlarged fragmentary front view in partial cross-section, of a portion of the FIG. 1 structure;

FIG. 4 is a side view taken along the plane of line 4—4 of FIG. 3, and looking in the direction of the arrows.

Figure 3:
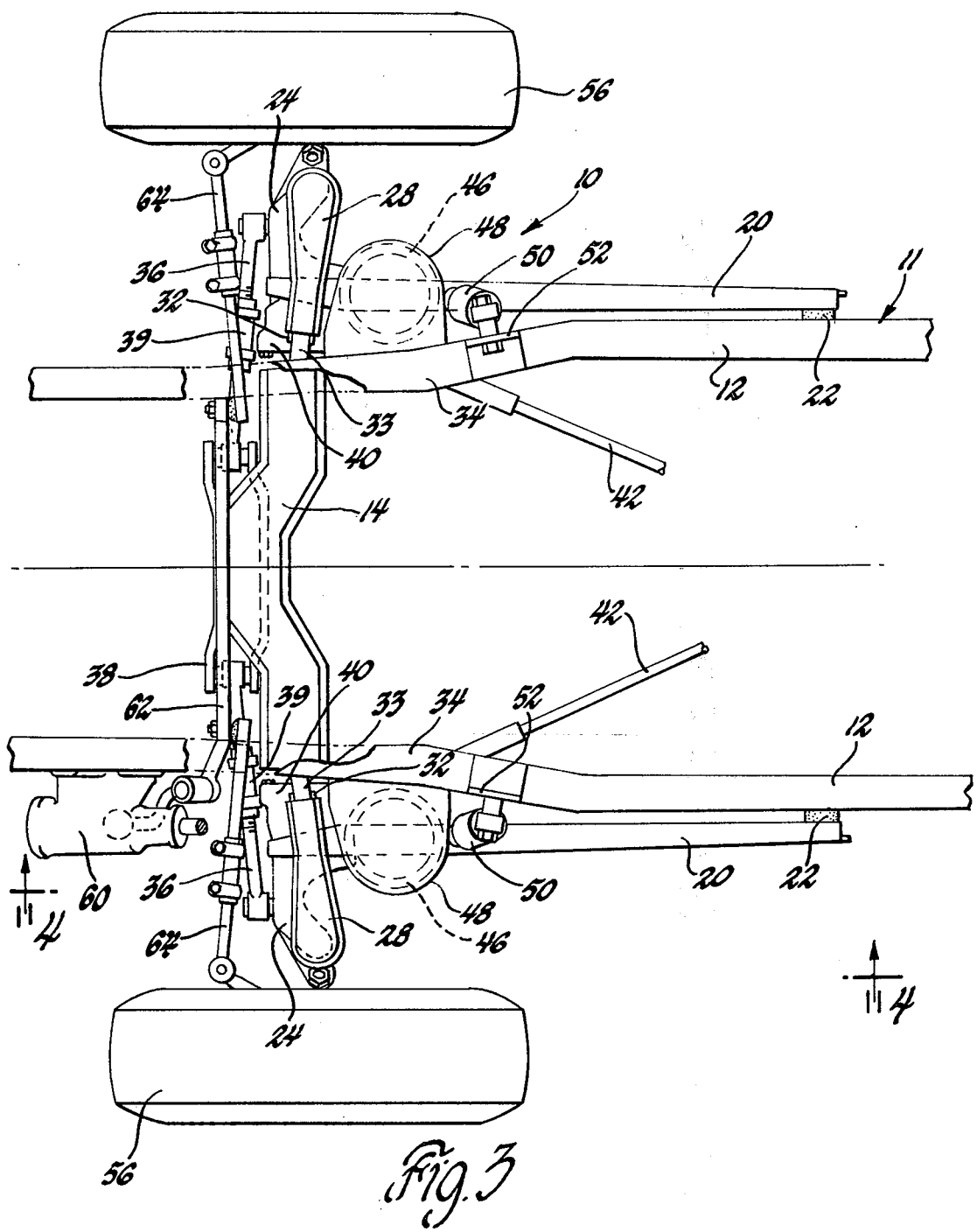
FIG. 3 is a top view taken along the plane of line 3—3 of FIG. 2, and looking in the direction of the arrows.

Referring now to the drawings in greater detail, FIGS. 1-4 illustrate a front suspension system 10 associated with an automotive frame 11 having oppositely disposed longitudinal side members 12, and respective front, middle, and rear cross-members 14, 16, and 18.

The suspension system 10 includes a pair of torque-reaction struts 20, each of which is pivotally secured at one end thereof by a pivot pin 22 to respective side members 12 at a point intermediate the front and middle cross-members 14 and 16, respectively. Each torque-reaction strut 20 extends generally longitudinally forwardly therefrom, with the forward end thereof positioned substantially adjacent the front cross-member 14. A vertically disposed support member 24, defining the wheel steering axis designated by the letter "A" in FIG. 2, is secured by bolts 26 to the forward end of each strut 20.

A laterally extending upper control arm or link 28 is pivotally connected at one end thereof by suitable pivot means 30 to each support member 24, and at the other end thereof by a pivot pin 32 to a bracket 33 formed on a combined upwardly, inwardly, and forwardly extended portion 34 of each frame side member 12. A laterally extending lower control arm or link 36 (FIG. 2) is pivotally connected between each support member 24 and the adjacent end of a contoured lower flange 38 formed on the front cross-member 14. A length-adjusting sleeve 39 is threadedly mounted at an intermediate point along each lower control arm 36. Suitable rubber bushing means [not shown] are employed at each end of each of the upper and lower control arms or links 28 and 36, respectively, for wear control and isolation advantage.

An angle-drive case 40 is also secured by any suitable means to the forward end of each torque-reaction strut 20, and each is driven by a shaft 42 extending from a suitable drive mechanism, such as a centrally located four-wheel drive-transfer case 44 (FIG. 1). A coil spring 46 is mounted between the upper surface of the forward end of each strut 20 and a retainer cup 48 secured to the forwardly extended frame portion 34. It should be realized that a different springing medium could be employed in lieu of the coil spring 46, for example, a torsion bar operatively connected to one of the lower or upper control arms 36 and 28, respectively. A shock absorber 50 is also mounted between each strut 20 and a bracket 52 formed on the frame portion 34 adjacent the retainer cup 48. If desired, other front drive arrangements, such as hydraulic- or electric-type drives, could be used in lieu of the angle-drive case 40 and V-shaped drive shafts 42 arrangement.

A steering knuckle 54 is pivotally mounted on a central portion of each support member 24. A front road wheel 56 is rotatably mounted on each steering knuckle 54. A drive shaft 58 extends from each angle-drive case 40 to a drive-spindle 59 of each respective front wheel 56. Suitable steering mechanism 60 and associated steering linkage 62 and 64 are operatively connected between a forward portion of the side member 12 on the operator's side and the two front wheels 56.

With the arrangement just described, embodying the torque-reaction strut 20, a substantial portion of the brake torque reaction is taken off of the front cross-member 14, as compared to prior arrangements.

From the foregoing and from the illustrations of FIGS. 1 and 2, it may be realized by those skilled in the art that the torque-reaction strut 20 and lateral control arms 28 and 36 arrangement provides a relatively high front ground clearance, ideal for recreational-type vehicles. It is apparent that such an arrangement also provides a clear area along the spindle axis for the attachment of front wheel drive components, while permitting pivotal movement in a suspension mode and lateral tilting and displacement in a steering mode.

Additionally, it has been determined that the inventive suspension system also provides: (1) an arrangement which inhibits a "knuckling" feel in the steering wheel often caused by universal joint torque variation at the kingpins; (2) a convenient means for mounting a roll-stabilizer bar; (3) a unique means of adjusting wheel camber on assembly and in service; and (4) a unique leading arm-type suspension structure with which most desired wheel geometry can be achieved, i.e., roll center, anti-dive, and toe and camber.

It should be apparent that the above-described suspension system would be applicable to a four-wheel or a rear wheel drive arrangement, as well as the front wheel drive application, by utilizing torque-reaction struts which extend rearwardly.

While but one embodiment of the invention has been shown and described, other modifications thereof are possible.

We claim:

1. In a vehicle having a sprung mass portion and an unsprung mass portion including a steerable road wheel rotatably supported on a spindle-portion of a steering knuckle, a suspension system for said steerable road wheel comprising a torque-reaction strut, means supporting said torque-reaction strut on said sprung mass portion for projection in the direction of forward motion of said vehicle, knuckle support means connected to said torque-reaction strut and defining a generally vertically-oriented steering axis, means attaching said steering knuckle to said knuckle support means, an upper control arm disposed substantially transversely between said knuckle support means and said sprung mass portion, a lower control arm disposed substantially transversely between said sprung mass portion and said knuckle support means, and resilient means disposed between said sprung mass portion and one of said torque-reaction strut, and said upper and lower control arms rearwardly of said vertically-oriented steering axis for effecting primary suspension of said sprung mass portion relative to said unsprung mass portion.

2. In a vehicle having a sprung mass portion and an unsprung mass portion including a steerable road wheel rotatably supported on a spindle-portion of a steering knuckle, a suspension system for said steerable road wheel comprising a torque-reaction strut, connector means supporting said torque-reaction strut on said sprung mass portion for projection in the direction of forward motion of said vehicle, a steering knuckle support member secured to said torque-reaction strut and including a vertical extension projecting vertically above said torque-reaction strut, means on said steering knuckle support member defining a generally vertically-oriented steering axis, means attaching said steering knuckle to said steering knuckle support member, an upper laterally extending control arm, resilient means pivotally connecting one end of said upper control arm to said sprung mass portion and the other end of said upper control arm to said vertical extension of said steering knuckle support member so that said upper control arm is disposed substantially transversely between said steering knuckle support member and said sprung mass portion, a lower laterally extending control arm, resilient means pivotally connecting one end of said lower control arm to said sprung mass portion and the other end of said lower control arm to said steering knuckle support member, length-adjusting means included on said lower control arm operable to alter the length of said lower control arm, and spring means disposed between said sprung mass portion and said torque-reaction strut rearwardly of said vertically-oriented steering axis for effecting primary suspension of said sprung mass portion relative to said unsprung mass portion.

3. In a vehicle having a sprung mass portion including a frame having side, front, middle, and rear cross-members, and a retainer cup, and an unsprung mass portion including a steerable road wheel drivingly attached to a drive spindle rotatably supported on a steering knuckle, a suspension system for said steerable road wheel comprising a torque-reaction strut, pivot means supporting said torque-reaction strut on an outer side surface of said frame side member for projection in the direction of forward motion of said vehicle, a steering knuckle support member rigidly attached to said torque-reaction strut and including a vertical extension projecting vertically above said torque-reaction strut, means on said steering knuckle support member defining a generally vertically-oriented steering axis, means attaching said steering knuckle to said steering knuckle support member, an upper laterally extending control arm, pivot means including rubber bushing means attaching one end of said upper control arm to said frame side member and the other end of said upper control arm to said steering knuckle support member vertical extension, a lower laterally extending control arm, pivot means including rubber bushing means attaching one end of said lower control arm to said front cross-member and the other end of said lower control arm to said steering knuckle support member, length-adjusting means included on said lower control arm operable to alter the length of said lower control arm, an angle-drive case rigidly attached to the forward end of said torque-reaction strut, a drive shaft operatively connected between said angle-drive case and said drive spindle, a drive-transfer case centrally disposed on said sprung mass portion, shaft means operatively connected between said drive-transfer case and said angle-drive case for effecting driven rotation of said steerable road wheel via said drive shaft, and a coil spring disposed between said retainer cup and the upper surface of the forward end of said torque-reaction strut rearwardly of said vertically-oriented steering axis for effecting primary suspension of said sprung mass portion relative to said unsprung mass portion.

* * * * *